June 6, 1961 C. E. LOMAX 2,987,578

LARGE CAPACITY SWITCHES FOR USE IN MULTI-OFFICE TELEPHONE SYSTEM

Filed May 22, 1957 4 Sheets-Sheet 1

INVENTOR.
CLARENCE E. LOMAX
BY C. R. Sipe
ATTY.

INVENTOR.
CLARENCE E. LOMAX
BY C. R. Sipe
ATTY.

LARGE CAPACITY SWITCHES FOR USE IN MULTI-OFFICE TELEPHONE SYSTEM
Filed May 22, 1957 4 Sheets-Sheet 3
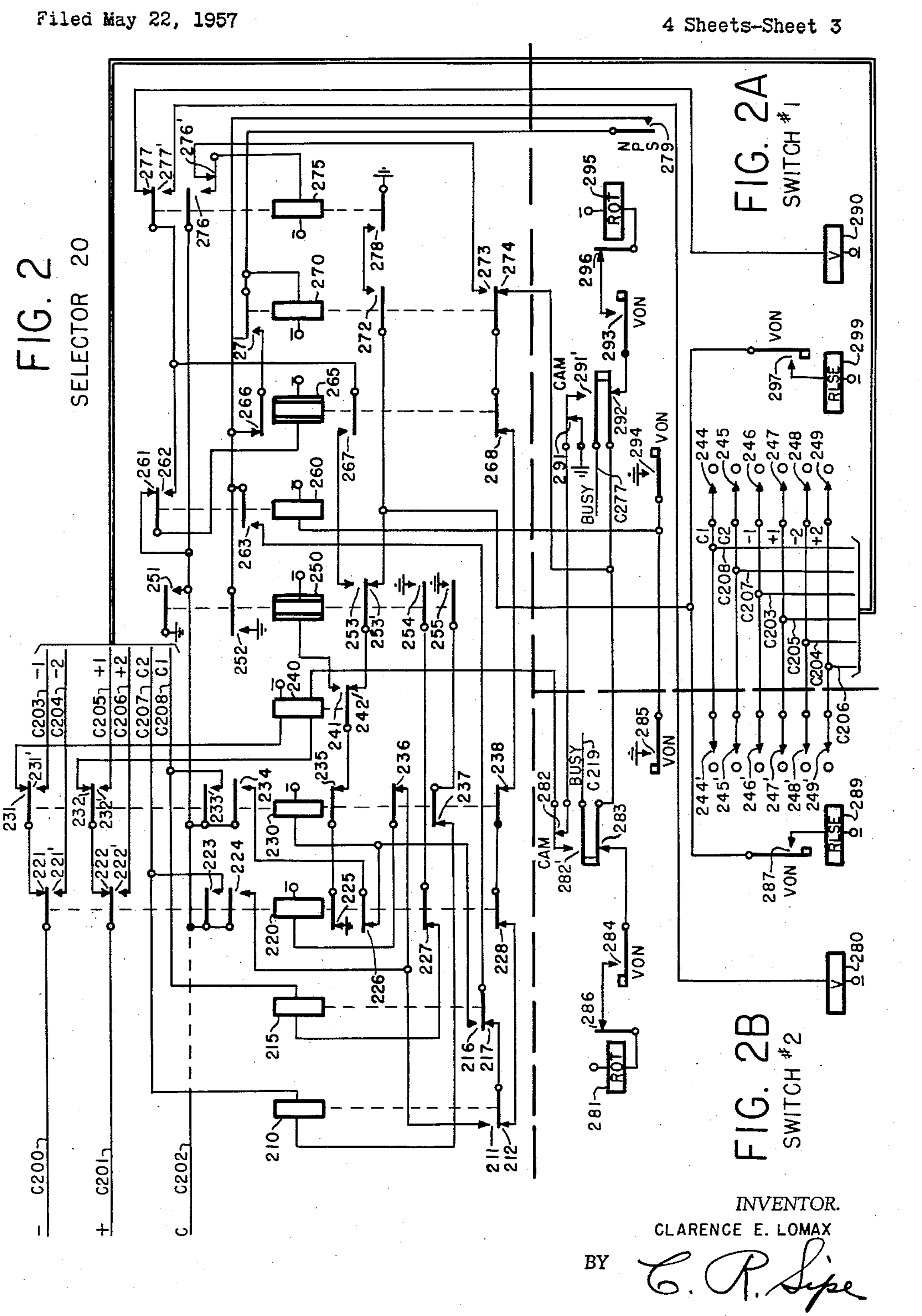
FIG. 2 SELECTOR 20, FIG. 2A SWITCH #1, FIG. 2B SWITCH #2
INVENTOR.
CLARENCE E. LOMAX
BY C. R. Sipe
ATTY.

June 6, 1961 C. E. LOMAX 2,987,578

LARGE CAPACITY SWITCHES FOR USE IN MULTI-OFFICE TELEPHONE SYSTEM

Filed May 22, 1957 4 Sheets-Sheet 4

INVENTOR.
CLARENCE E. LOMAX
BY C. R. Sipe
ATTY.

2,987,578
Patented June 6, 1961

2,987,578

LARGE CAPACITY SWITCHES FOR USE IN MULTI-OFFICE TELEPHONE SYSTEM

Clarence E. Lomax, Hastings, Nebr., assignor to Automatic Electric Laboratories, Inc., a corporation of Delaware Filed May 22, 1957, Ser. No. 660,972
10 Claims. (Cl. 179—18)

This invention relates in general to automatic switches for use in automatic telephone or like signalling systems, and is more particularly concerned with increasing the trunking efficiency and capacity of automatic selector switches in multi-office connections.

It is an object of the present invention to provide in a numerical switch, two switching mechanisms having common relays associated therewith, whereby each switching mechanism has access to two hundred trunks, including means for determining which switching mechanism is to be used.

It is another object of the present invention to provide by means of the mentioned numerical switches, a simplified and efficient multi-office trunking and switching system.

A feature of the present invention resides in the utilization of one type of numerical switch having two sets of bank levels and corresponding independently operated wipers, whereby the receipt or non-receipt of a momentary ground pulse from a bi-level repeater determines which set of wipers will be operated and which set of bank levels will be accessed.

Another feature of the present invention resides in the utilization of a second type of numerical switch having two sets of bank contacts and corresponding independently operated wipers, whereby upon receipt of certain digital impulses a first wiper set is operated and a first set of bank contacts will be accessed, and upon receipt of a predetermined digital impulse the first wiper set will drop back and the next digital impulses will operate a second set of wipers and a second set of bank contacts will be accessed.

A further feature of the present invention in regards to the above-mentioned numerical switches, resides in the utilization of common relays which respond regardless of which set of wipers are operated and which set of bank contacts are to be accessed.

Other objects and features will become apparent from a perusal of the following specification taken in combination with the accompanying drawings, in which:

FIG. 2 shows a selector relay group 20 common to the two switch mechanisms shown in FIGS. 2A and 2B.

FIG. 2A shows the first switching mechanism for selector relay group 20 having wipers accessible to 200 trunks.

FIG. 2B shows the second switching mechanism for selector relay group 20 having wipers accessible to 200 trunks.

Figure 1A:
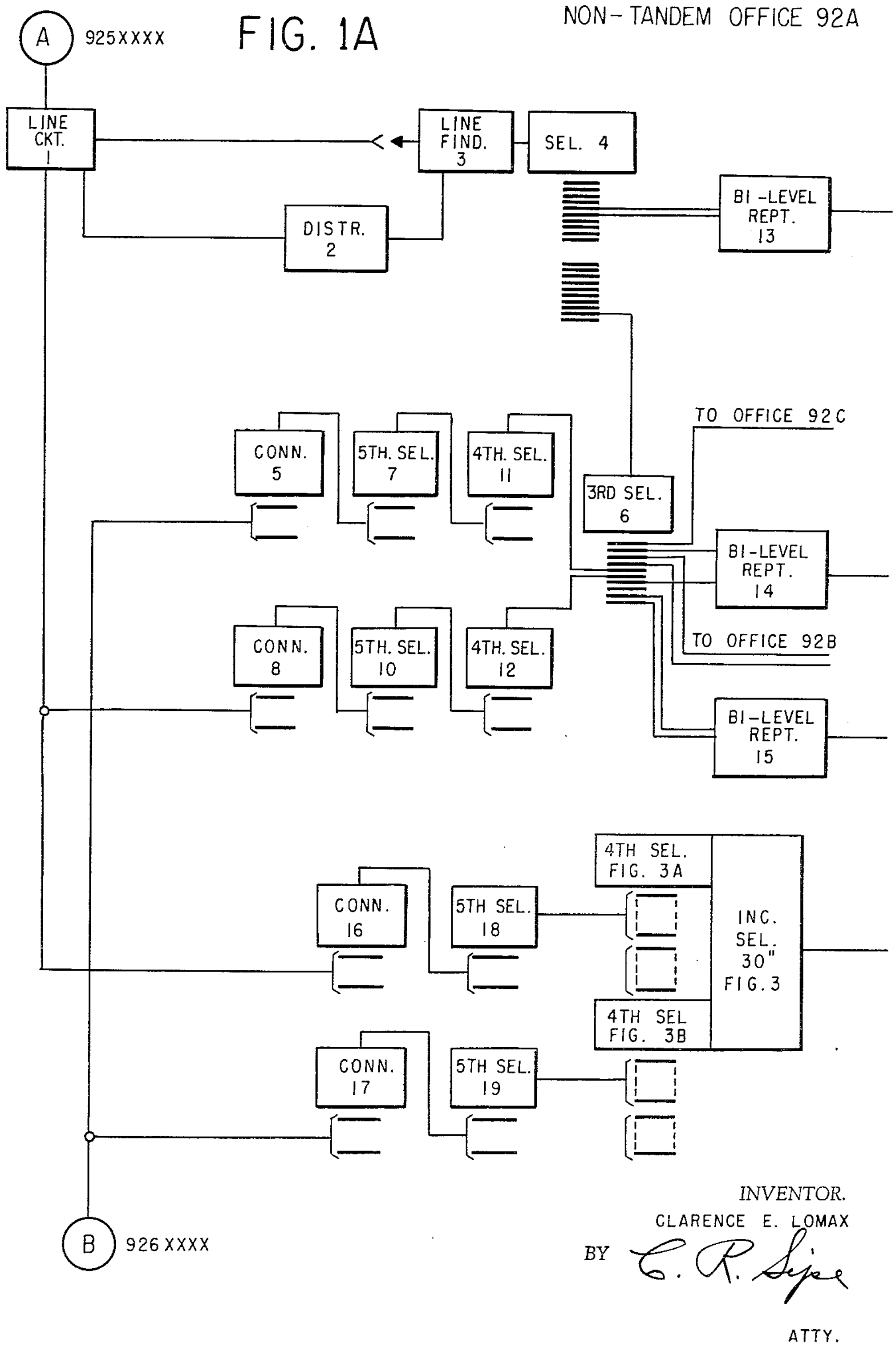
FIGS. 1A and 1B show a trunking diagram of a tandem and non-tandem office utilizing the numerical switches of the present invention in a telephone area including other tandem and non-tandem offices.
Figure 1B:
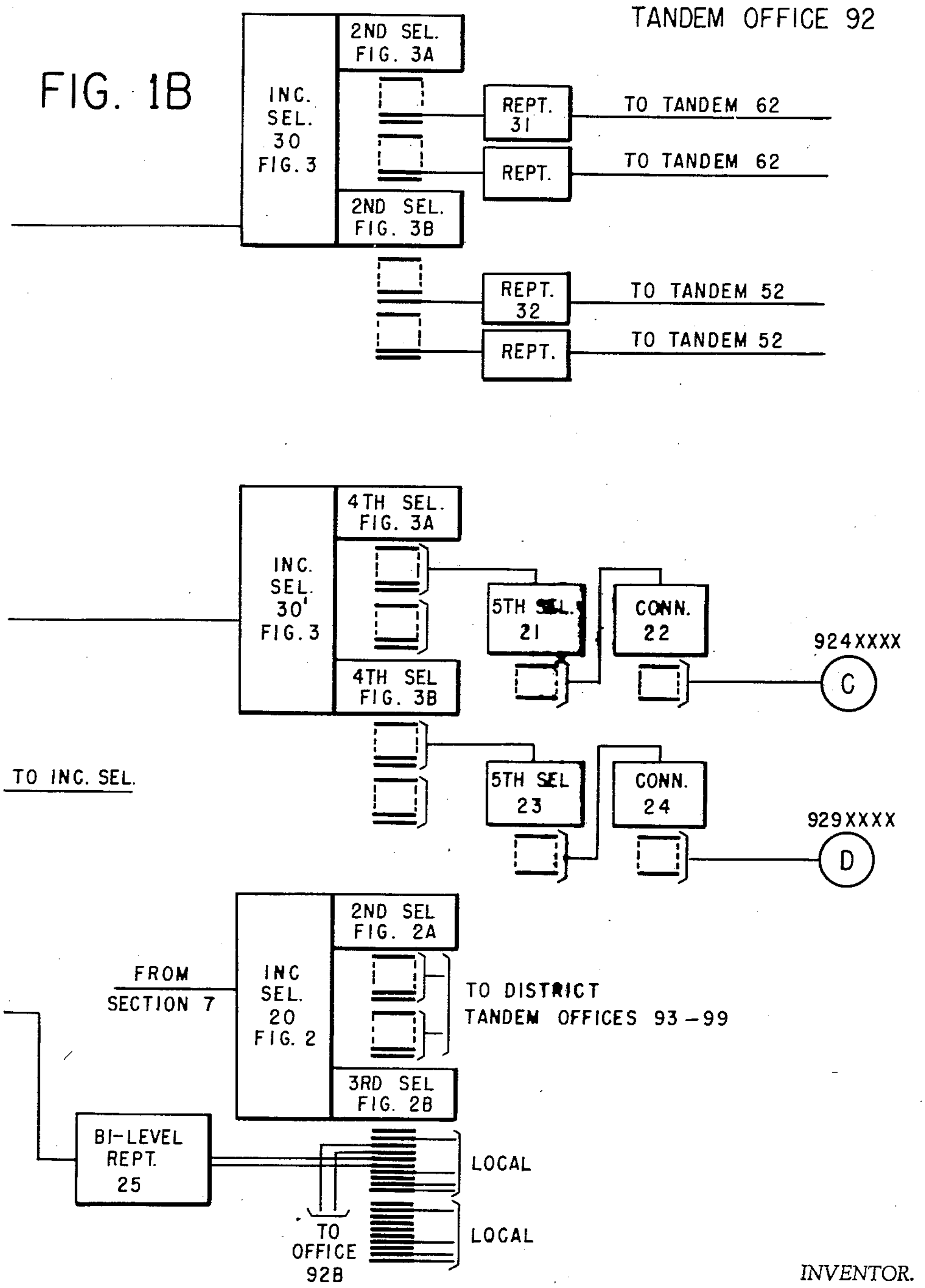

Referring to the trunking diagram in FIGS. 1A and 1B, there is shown part of an area over which direct dialling is had by subscribers.

In a large area over which subscribers do direct dialling in a telephone system, the area is divided in parts. The area in which the present invention is concerned, is divided into eight sections and each section is divided into eight districts. Each district may have from one to ten offices and each office may have from one to ten office units. In compliance with inter-toll dialling, seven-digit call numbers will be used. Each district has one tandem office or exchange, and each tandem office serves as a tandem office for incoming calls from all other districts in all sections. Each tandem office also serves as a tandem office for outgoing calls to all sections except the section in which the calling office is located. Thus, when the subscriber dials a directory number, the first digit indicates the section, the second digit indicates the district, and the third digit indicates the office unit.

In FIG. 1A, Office 92A is typical of all the non-tandem offices in the area. As mentioned, each district has a tandem center, and a portion of Tandem Office 92 is represented in FIG. 1B, that is section 9—district 2. Calls to offices outside the local section, and from offices other than the tandem office, must go through the tandem office of the local district to reach an office outside the local section; e.g., Office 92A must dial a digit in Tandem Office 92 to reach sections 2 to 8. It will be assumed that the section tandem office for section 9 is in district 92, which also serves as a local office, and it also serves as the district tandem office for district 92. We identify that office and location by calling it Tandem Office 92. The district also has two other Non-Tandem Offices 92B and 92C, although not shown. Office 92A will handle subscribers having the first three numbers "925" and "926." Tandem Office 92 will handle subscribers having the first three numbers "921," "922," "924," and "929." Office 92B (not shown) will handle subscribers "927" and '928." Office 92C (not shown) will handle subscribers "920."

Selector 20 is the incoming selector at Tandem Office 92 that serves calls from other sections. Since section 9 is to be considered large, it will have heavy traffic from each office of the other sections. That makes it desirable to have twenty trunks per level in order to get greater trunk efficiency. Two sets of banks and wipers on incoming selector 20 are used to let them operate as both second and third selectors. It is for this reason that incoming selector 20 uses two switch mechanisms and lets one group of relays serve both mechanisms. Each of the mechanisms has two sets of wipers, so that gives us the twenty trunks per bank level, and the two combined mechanisms give us forty accessible levels or four hundred trunks.

Selectors 30, 30′, and 30″ (FIG. 3) are incoming selectors to serve one incoming trunk and also contains two switch mechanisms. However, in these selectors, a bi-level repeater individual to the incoming trunk, upon transmitting or non-transmitting of ground, determines which switch mechanism and level of banks will be used and controls the destination of the call. The bi-level repeaters to be used are of the type disclosed in FIG. 4 of my copending application, Serial No. 630,626, filed December 26, 1956, now Patent No. 2,897,280. In this application, the level of access to the repeater from a selector determines whether or not a ground will be forwarded to an incoming switch. Also, one of the bi-level repeaters, namely 13, will be accessed by a 1 and 2 drop back selector 4, which is of the type disclosed in an application by Idris T. Richards, Patent No. 2,183,030, issued December 12, 1939. In this patent, if a predetermined digit is dialled, the digit will be absorbed and the second digit dialled will step the wipers over one level of banks. However, if any other first digit is dialled, the switch will step over another level of banks. A detailed explanation will now follow:

*Local call in Non-Tandem Office 92A*

Assuming that a subscriber A (FIG. 1A) desires to call subscriber B. All subscribers having, as their directory numbers, the first three numerals 925 or 926, will be handled locally through non-tandem office 92A. Subscriber A having directory number 925XXXX and subscriber B having directory number 926XXXX, it will thus be seen that this will be a local call within Office 92A. (The letters "X" being any assumed digit.) Although it is the usual custom to have letters represent the office code, numerals are used in the present case so the selector level can be more easily identified.

Upon subscriber A lifting his handset, the closure of the line loop will operate a line circuit 1, which in turn, by means of a distributor 2, will cause a finder, such as finder 3, to search for and connect with the calling party in a manner well-known in the art. It will be assumed that this finder 3 is linked with 1 and 2 digit drop back selector 4.

As previously mentioned, selector 4 is of the type disclosed in the Richards patent, and since the first digit to be dialled is "9" this selector will drop back and absorb the digit. Thus, upon subscriber A dialling the digit "9," it will be absorbed and the wipers for the lower level will be effective to extend the connection in response to dialling the second digit in a manner explained in said Richards patent. Upon selector 4 receiving the next dialled digit "2," the lower wiper set of selector 4 will step to the second level and rotate in search of a third selector, such as third selector 6. The third selector 6 will respond to the next dialled digit, the digit "6," and upon receipt of the digital impulses, the wipers will step to the sixth level and rotate in search of an idle fourth selector, such as fourth selector 11. The remaining digits to be dialled will thus be responded to by a fifth selector, such as selector 7, and a connector, such as 5, all in a well-known manner. The connector will thus ring the calling subscriber B and extend the loop circuit hereto, also in a well-known manner.

*Calls within the district*

We will assume subscriber A desires to make a call associated with Tandem Office 92, such as subscriber C having directory number 924XXXX. Subscriber C being in the same district 92 as subscriber A, will have the same first two directory digits "9" and "2," however the third digit in this case will be the digit "4." Subscriber A upon dialling the first two digits "92" will extend the loop circuit to third selector 6 in a manner previously disclosed.

Upon subscriber A dialling the third digit "4," the digital impulses will step the wipers of third selector 6 to the fourth level and rotate in search of an idle bi-level repeater, such as repeater 14. Bi-level repeater 14 upon being seized will in turn seize incoming selector 30'. In regards to bi-level repeater 14, it is as previously mentioned of the type shown in FIG. 4 of my copending application, Serial No. 630,626. As shown in FIG. 1A, bi-level selector 14 is accessed from two levels of third selector 6 which will correspond to the two level access to repeater 41 in my mentioned copending application. It will be assumed that the access to repeater 14 in the present case corresponds to the access via trunk C401 of my copending application which will cause this repeater to repeat all digital impulses dialled therein.

Figures 3, 3A, 3B:
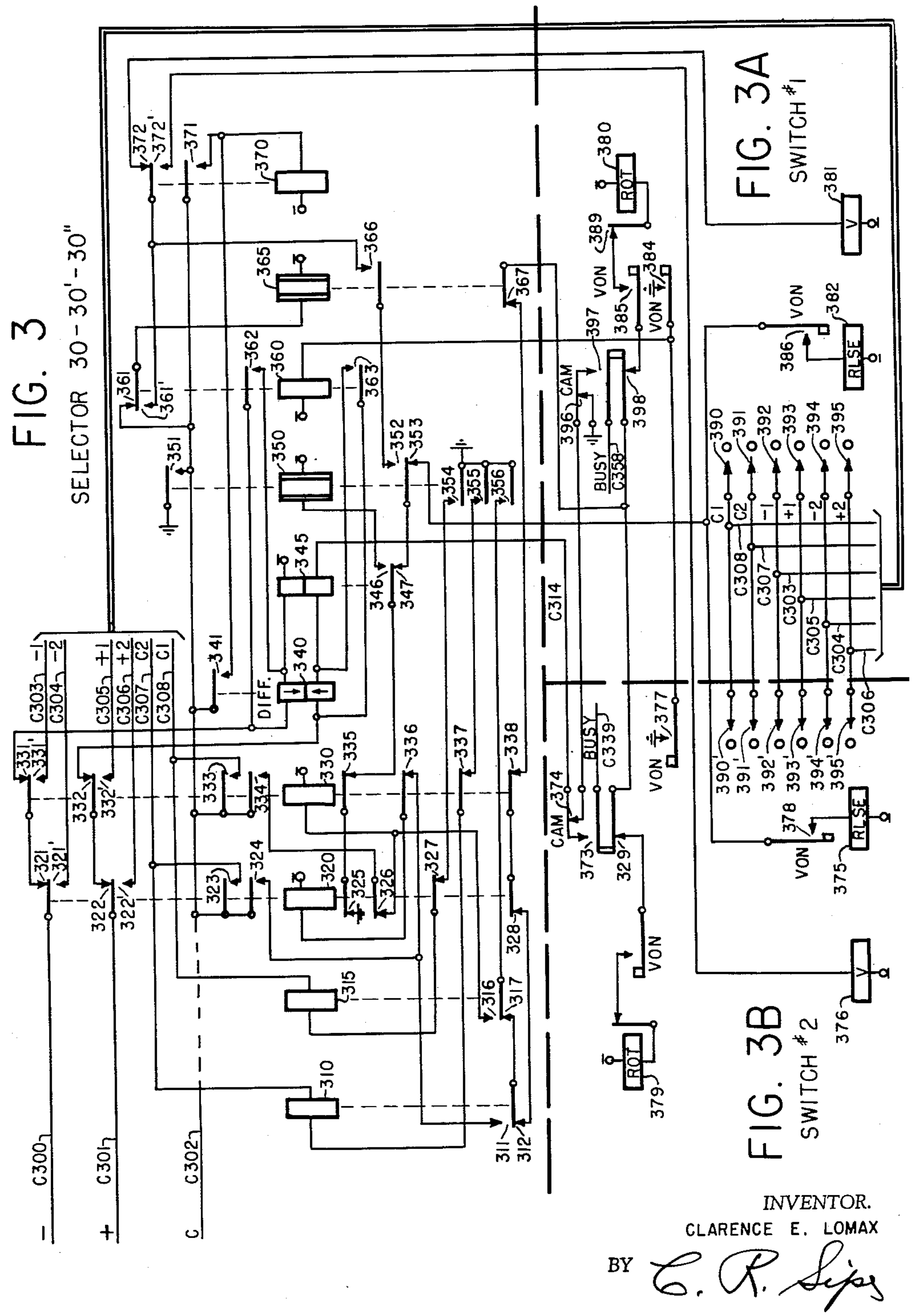
FIG. 3 shows another selector relay group 30 common to the two switch mechanisms shown in FIGS. 3A and 3B.
FIG. 3A shows the first switching mechanism for selector relay group 30 having wipers accessible to 200 trunks.
FIG. 3B shows the second switching mechanism for selector relay group 30 having wipers accessible to 200 trunks.

Upon seizure of selector 30' the loop circuit is closed to operate pulsing relay 345 over a circuit extending from battery, upper windings of relays 345 and 340, contacts 331, 321, negative conductor C300, over the loop, positive conductor C301, contacts 322, 332, lower windings of relays 340 and 345, conductor C314, cam spring contacts 374 (FIG. 3B) and 396 (FIG. 3A), to ground. Relay 340, being of the differential type, will not operate over this loop circuit. The operation of relay 345, at contacts 346 closes a circuit to operate relay 350 over a circuit including ground, contacts 325 and 335. The operation of relay 350 at contacts 351 closes a circuit to operate relay 365. At contacts 354 ground is closed to C1 conductor C308 via winding of relay 315. At contacts 355 a circuit is prepared to relay 310 and closes ground to C2 conductor C307 and the wiper associated therewith. At contacts 356, a circuit is prepared to the rotary magnets of the switch mechanisms. The operation of relay 365 at contacts 366, and relay 350 at contacts 352 prepares a circuit to vertical magnet 381 of Switch #1 (FIG. 3A). At contacts 367 a prepared circuit to rotary magnet 380 is opened.

Upon the next digit being dialled, repeater 14 will repeat the digital impulses and pulsing relay 345 will respond thereto by intermittently energizing and deenergizing. Upon receipt of the first of a series of digital impulses, relay 345 will restore and open the circuit to relay 350. Relay 350 being of the slow-to-release type will remain operated throughout the impulse series. At contacts 347, a circuit is closed to vertical magnet 381; the circuit extending from ground, contacts 325, 335, 347, 352, 366, 372, winding of vertical magnet 381, to battery. Relay 345 will open and close contacts 347 to pulse vertical magnet 381 whereby vertical magnet 381 will step the wipers 390, 391, 392, 393, 394, 395, associated with switch mechanism #1. Upon the wipers taking the first vertical step, the VON springs will operate. The operation of the VON springs close contacts 384 to complete an obvious circuit to operate relay 360, and at VON contacts 386 a circuit is prepared to release magnet 382. At VON contacts 385, a circuit is prepared to rotary magnet 380. The operation of relay 360, at contacts 361 opens the operating circuit to relay 365, however, at contacts 361' relay 365 is now in parallel with vertical magnet 381 and remains operated throughout the impulse series. At contacts 362 and 363, differential relay 340 is shunted so that the resistance therein will not interfere with pulsing of relay 345. Vertical magnet 381 will thus step the wipers to the level corresponding to the digit dialled.

At the end of the series of digital impulses relay 365 will restore to open, at contacts 366, the operating circuit to vertical magnet 381. At contacts 367, a circuit is closed to rotary magnet 380; the circuit extending from ground, contacts 356, 317, 312, 328, 338, 367, 398, 385, 389, winding of rotary magnet 380, to battery. Rotary magnet 380 will energize and open its interrupter contacts 389, which will in turn deenergize rotary magnet 380 to close contacts 389 and reenergize rotary magnet 380. The intermittent opening and closing of interrupter contacts 389 will rotate the wipers of Switch #1 over the level the wipers were vertically stepped to and search for an idle fifth selector, such as fifth selector 21. Both control wipers, C390 and C391 will search simultaneously for battery indicating an idle selector. If control wiper 390 finds an idle fifth selector, battery will be returned over C1 conductor C308 to operate relay 315, and if control wiper 391 finds an idle fifth selector battery will be returned over C2 conductor C307 to operate relay 310. With two sets of wipers rotating simultaneously, twenty trunks are available for seizure.

Assuming a fifth selector, such as 21 is seized via control wiper 390, relay 315 will operate over a circuit including contacts 327 and 354. The operation of relay 315 at contacts 317, will open the circuit to rotary magnet 380 to stop further rotary stepping. At contacts 316, an obvious circuit is closed to operate relay 330. The operation of relay 330 at contacts 331 and 332 opens the circuit to pulsing relay 345, which restores. At contacts 331' and 332' the loop circuit is extended to fifth selector 21 over circuits including negative conductor C303 and wiper 392, and positive conductor C305 and wiper 393. At contacts 333 and 334 a locking circuit is closed to relay 330. Contacts 335 and the restoration of relay 345 at contacts 346 open the circuit to restore slow-to-release relay 350 after a short interval. At contacts 336, a prepared circuit is opened to prevent false operation of relay 320. At contacts 337, a prepared circuit is opened to prevent a false operation of relay 310. The restoration of relays 345 and 350, at contacts 347 and 353, prepares a circuit to release magnet 382. At contacts 354, the circuit to relay 315 is opened, causing restoration thereof. At contacts 356, the operating circuit to relay 330 is opened, however, relay 330 remains operated over the mentioned locking circuit.

Had an idle fifth selector, such as selector 21 been found idle during rotation by control wiper 391, battery would be returned over C2 conductor C307 to operate relay 310. The operation of relay 310, at contacts 312 would open the rotary circuit. At contacts 311, a circuit is closed to relay 320; the circuit extending from battery, winding of relay 320, contacts 336, 311, 317, 356, to ground. The operation of relay 320, at contacts 321, 322 open the circuit to pulsing relay 345 to cause restoration thereof. At contacts 321′ and 322′ the loop circuit is extended to the fifth selector via negative conductor C304 and wiper 394, and positive conductor C306 and wiper 395. At contacts 323 and 324, relay 320 locks operated from ground on C2 conductor C307. Contacts 325 and the restoration of relay 345 at contacts 346 opens the circuit to slow-to-release relay 350, which restores after a short interval. At contacts 327, a prepared circuit is opened to prevent a false operation of relay 315. At contacts 328, the circuit to rotary is further opened. The restoration of relay 350 at contacts 353 prepares a circuit to release magnet 382. At contacts 355 the circuit to relay 310 is opened to cause restoration thereof. Contacts 356 and the restoration of relay 310 at contacts 311 opens the original operating circuit to relay 320 however, relay 320 remains operated over the mentioned locking circuit.

In the event that neither set of wipers finds an idle fifth selector, the wipers will rotate to the eleventh or rotary off-normal position which will operate the cam springs. The operation of the cam springs, at contacts 398 opens the circuit to the rotary magnet 380 to stop rotation of the wipers. At contacts 396 direct ground is removed from relay 345, however, busy tone and ground is replaced at contacts 397 to hold relay 345 operated and return busy tone to the calling party; the busy tone extending from conductor C358, cam contacts 397, 374 of Switch #2, lower winding of relays 345, 340, contacts 332, 322, and positive conductor C301 to the calling subscriber.

In the event that a fifth selector, such as 21 is seized, the next digit dialled will be responded to by this selector in a conventional manner. The last two digits will be responded to by a connector, such as connector 22, to ring the called subscriber C also in a conventional manner.

Assuming subscriber A desires to call subscriber D which is also associated with Tandem Office 92. In this case the third directory number of subscriber D is the digit "9." Third selector 6 will be seized responsive to dialling the first two digits "92" in a manner previously disclosed. The dialling of the third digit "9" by subscriber A will step the wipers of third selector 6 to the ninth level and search for an idle bi-level repeater such as 14, in a well-known manner. As previously mentioned bi-level repeater 14 is of the type disclosed in my copending application, and it will be assumed that upon being seized from level nine, it will correspond to being seized via trunk C402 of FIG. 4 of my copending application. In this event ground is momentarily forwarded over the negative conductor from the bi-level repeater, and since incoming selector 30′ terminates this repeater the ground will be received over negative conductor C300.

Upon receipt of the momentary ground over negative conductor C300, differential relay 340 will momentarily operate. Upon operating, relay 340 at contacts 341 closes an obvious circuit to operate relay 370. The operation of relay 370 at contacts 371 closes a locking circuit to ground via contacts 351. Upon seizure of selector 30′, relays 345, 350 and 365 will operate in a manner as previously described. Upon termination of the momentary ground, differential relay 340 will restore and open contacts 341. The operation and locking of relay 370, at contacts 372 opens the prepared circuit to Switch #1 and transfers at contacts 372′ a control circuit to vertical magnet 376 of Switch #2. Upon receipt of the next series of digital impulses vertical magnet 376 will step wipers 390′, 391′, 392′, 393′, 394′ and 395′ to a level corresponding to the digit dialled in a manner identical to that described with respect to Switch #1, with the exception that the Switch #2 wipers steps over a different set of bank contacts in search of an idle fifth selector, such as selector 23. Thus, upon seizing an idle fifth selector such as 23, the loop circuit will be extended thereto in a manner previously explained. The remaining digits will then be dialled to extend the call to subscriber D via a connector, such as connector 24 in a well-known manner.

*Release*

Upon termination of the call, ground will be removed from either C conductor C307 or C308 depending upon which set of wipers extended the call. Assuming ground is removed from C conductor C307, relay 320 will restore whereby, at contacts 321 and 322 a circuit is prepared for future pulsing. At contacts 325, a circuit is completed to the release magnets 382 or 375 depending upon whether Switch #1 or Switch #2 was used; the circuit extending from ground, contacts 325, 335, 347, 353 and then to VON contacts 386, release magnet 382 to battery, or VON contacts 378, release magnet 375 to battery. In either case, the release magnet will restore its respective wipers to normal and restore its respective VON springs. Upon restoration of the VON springs, either VON contacts 384 or 377 will open to restore relay 360. Also, either VON contacts 386 or 378 will open to deenergize either release magnet 382 or 375.

*Calling a subscriber in a different section*

In the event that a subscriber wishes to call a subscriber in a different section, the call must go through the tandem office associated with the calling party, as well as the called party. For instance, if subscriber A wishes to call a party in section 6, the call must go through Tandem Office 92 and then through a district tandem office in section 6.

Assuming subscriber A wishes to call a party in section 6-district 2, the lifting of the receiver, it will be assumed, seizes 1 and 2 digit drop-back selector 4 via line finder 3, distributor 2, and line circuit 1. Since the first digit to be dialled is the digit "6," selector 4 will not drop back but instead will step the wipers to the upper sixth level and search for an idle bilevel repeater, such as 13. Upon an idle bi-level repeater, such as 13 being found, it will be assumed that the sixth level seizing thereof will cause this repeater to in turn seize incoming selector 30 without sending momentary ground. Incoming selector 30 not receiving any ground pulse from the repeater will set up the call to use Switch #1 (FIG. 3A) in a manner previously disclosed. The wipers of Switch #1 in this case will have access through repeaters, such as 31, to Tandem Offices 62—69, and since it has been assumed that district 2 is wanted the dialling of the digit "2" by subscriber A will step the wipers 390–395 to the second level and rotate in search of an idle trunk extending to Tandem Office 62. In this case the repeater 31 extends holding ground back to selector 30 to hold the connection.

On an attempt by subscriber A to call a party in section 5, the dialling of the digit "5" into selector 4 will cause a bi-level repeater, such as 13 upon being accessed from the fifth level, to transmit a momentary ground pulse into incoming selector 30. Upon receipt of the ground pulse the call will be transferred to Switch #2 in a manner previously disclosed. The wipers 390'—395' of Switch #2 (FIG. 3B) will have access through repeaters, such as 32, to Tandem Offices 52—59 and the repeaters will extend ground back to hold selector 30 operated.

It is to be understood that any pair of predetermined levels on the upper banks of selector 4, other than the first, ninth, or tenth level, will also have access to bi-level repeaters identical with repeater 13 and will also have an incoming selector identical with selector 30 being accessed thereby. Likewise, these selectors will obviously determine which section and district tandem office the call will be extended to upon receipt of the corresponding dialled digits. The first upper level of selector 4 would more than likely be used for special service calls, and the tenth upper level for toll calls which is the usual custom of first selectors.

As shown in dotted lines in FIG. 3, an incoming C conductor C302 is shown. This C conductor is merely shown in case selector 30 is preferred to be accessed by a preceding selector switch without requiring the services of a repeater. If this be the case, upon searching by the wipers of a preceding switch, selector 30 would be found idle from battery through the wipers of relay 365, and if busy from ground via contacts 351 or from ground via any of the control wipers.

*Tandem office incoming calls*

As mentioned, all incoming calls from other sections must first go through the tandem office. It is quite understandable that certain sections of an area are considerably smaller than other sections and naturally they do not require all the necessary equipment of the larger sections. It will be assumed therefore that section 7 is to be of the smaller type, and call herefrom to other sections will be extended upon dialling only the digit corresponding to the section wanted. Tandem Office 92 will thus act as the tandem office for section 9.

Upon a subscriber in section 7 dialling the digit "9," a selector (not shown) will step and rotate in search of an idle trunk to section 9. Assuming that an idle trunk is found and terminates into a repeater (not shown), the repeater will in turn seize incoming selector 20 (FIG. 2). Upon seizure, the loop circuit from the calling party is extended to selector 20, and operates pulsing relay 240; the circuit extending from battery, upper winding of relay 240, contacts 231, 221, negative conductor C200, over the loop, positive conductor C201, contacts 222, 232, lower winding of relay 240, cam contacts 282 of Switch #2, cam contacts 291 of Switch #1, to ground. The operation of relay 240, at contacts 241 closes an obvious circuit to operate slow-to-release relay 250. The operation of relay 250 closes contacts 251 to operate relay 265. At contacts 254 ground is placed on C conductor C208, and at contacts 255 ground is placed on C conductor C207. Relay 265 operates, and at contacts 266 opens a prepared circuit to relay 270. At contacts 267, circuits are prepared to vertical magnets 290 and 280 of Switch #1 (FIG. 2A) and Switch #2 (FIG. 2B) respectively. Selector 20 is now ready to receive digital impulses.

If the call is intended for a party in districts 3 to 9, the wipers of Switch #1 will extend the call thereto via a repeater upon dialling a digit corresponding to the district wanted. However, if the call is to a party in district 2, the receipt of two digital impulses will cause Switch #1 to drop back and prepare Switch #2 to receive the next digit. In other words, the dialling of the digit "2" into selector 20 means that a subscriber within the district (district 2) in which the call is received, is wanted. Switch #2 will thus respond as a third selector in the switch train.

Assuming that a call is intended for district 3 of section 9, the dialling of the digit "3" by the calling party will cause pulsing relay 240 to intermittently restore and reoperate. Upon receipt of the first pulse of a series of three, relay 240 will restore and open contacts 241, however, relay 250 will remain operated throughout the impulse series due to its slow-to-release characteristics. At contacts 242 a circuit is closed to energize vertical magnet 290; the circuit extending from ground, contacts 225, 235, 242, 253, 267, 277, winding of vertical magnet 290, to battery. Relay 240 will intermittently energize and deenergize to thus pulse vertical magnet 290. Upon each pulse received by vertical magnet 290, the wipers 244, 245, 246, 247, 248, and 249 will take one step vertically. Upon the first step taken by the wipers, the VON springs will operate whereby; at VON contacts 293 a circuit to rotary magnet 295 is prepared; at VON contacts 294 an obvious circuit is closed to operate relay 260; at VON contacts 297 a circuit is prepared to release magnet 299. The operation of relay 260 at contacts 261 opens the original circuit to relay 265, however, at contacts 262 relay 265 is connected in parallel with vertical magnet 290 and will remain operated throughout the series of digital impulses. At contacts 263 a circuit is prepared to rotary magnet 295. At the end of the series of digital impulses, relay 240 will reoperate and vertical magnet 290 will have stepped the wipers 244–249 to the third level. Relay 265 restores and at contacts 267 opens the circuit to vertical magnet 290. At contacts 268 a circuit is closed to energize rotary magnet 295; the circuit extending from ground, contacts 252, 263, 217, 212, 228, 238, 268, 274, 292, VON contacts 293, interrupter contacts 296, winding of rotary magnet 295, to battery. Rotary magnet 295 by means of its interrupter contacts 296 will rotate the two sets of wipers over the third level in search of an idle repeater (not shown) extending to district 3.

Assuming control wipers 245 encounters an idle trunk containing battery on its C conductor, relay 210 will operate over a circuit including C2 conductor C207, winding of relay 210, contacts 237, 255, to ground. The operation of relay 210 at contacts 212 opens the circuit to rotary magnet 295, which deenergizes and stops rotary hunting of the wipers. At contacts 211 a circuit is closed to relay 220; the circuit extending from battery, winding of relay 220, contacts 236, 211, 217, 263, 252, to ground. Relay 220 upon operating opens contacts 221 and 222 to restore relay 240. At contacts 221' and 222' the loop circuit is extended to an incoming selector via a repeater in Tandem Office 93. At contacts 223 and 224, relay 220 locks operated to grounded C conductor C207. At contacts 225, a prepared circuit to release magnet 299 is opened. At contacts 226, a prepared circuit to relay 230 is opened to prevent a false operation thereof. At contacts 227 a prepared circuit to relay 215 is opened to prevent a false operation thereof. The restoration of relay 240 at contacts 241 opens the circuit to slow-to-release relay 250. After a short interval relay 250 restores and at contacts 251 removes the ground locking relay 220 operated however, ground from the succeeding equipment is returned via C conductor C207 to hold the preceding equipment by the succeeding repeater. At contacts 252 the operating circuit to relay 220 is opened, however, relay 220 remains operated over the mentioned locking circuit. At contacts 253' a circuit is prepared to release magnet 299. At contacts 255 the circuit to relay 210 is opened causing relay 210 to restore. The remaining digits to be dialled will now extend the connection via Tandem 93.

Had control wiper 244 of the second set of wipers found an idle trunk before control wiper 245, battery would be extended back over C1 conductor C208 from an idle repeater to operate relay 215 over a circuit including contacts 227 and 254 to ground. Relay 215, operating contacts 217, opens the rotary circuit. At contacts 216 a circuit is closed to relay 230; the circuit extending from battery, winding of relay 230, contacts 216, 263, 252, to ground. Relay 230 operates and opens the circuit to pulsing relay 240 at contacts 231 and 232. At contacts 231' and 232' the loop circuit is extended to the idle trunk and repeater via negative conductor C203 and wiper 246, and positive conductor C205 and wiper 247. At contacts 233 and 234, relay 230 locks operated to grounded C conductor C208. At contacts 237 a prepared circuit to relay 210 is opened to prevent any false operation thereof. Relays 240 and 250 will restore, which in turn will restore relay 215 upon the opening of contacts 254. The remaining digits to be dialled will now extend the connection via Tandem 93.

Assuming that a subscriber in section 7 wishes to call subscriber A, incoming selector 20 will be seized upon dialling the first digit "9." The next digit which is the digit "2" will be responded to by selector 20, and step the wipers of Switch #1 to the second level in a manner previously described. The second level of Switch #1 is a dead level and for this reason normal post springs are provided to operate upon the wipers being stepped thereto. As previously described, at the end of the series of digital impulses relays 240, 250 and 260 will be operated. Normal post spring contacts 279 will close on the second level to complete a circuit to relay 270; the circuit extending from battery, winding of relay 270, NPS contacts 279, contacts 252, to ground. Also, after a short interval slow-to-release relay 265 restores after pulsing and at contacts 268 and contacts 273 of relay 270 a circuit is closed to operate relay 275; the circuit extending from battery, winding of relay 275, contacts 276', 273, 268, 238, 228, 212, 217, 263, 252, to ground. At contacts 266 relay 265 closes a locking circuit for relay 270 via contacts 252 and 271. The operation of relay 275 opens at contacts 276' its original operating circuit, however, contacts 276 closed to lock relay 275 operated via contacts 251 and ground. At contacts 277 the circuit to vertical magnet 290 of Switch #1 is opened, and at contacts 277' a circuit is prepared to vertical magnet 280 of Switch #2. At contacts 278 of relay 275 and contacts 272 of relay 270, an obvious circuit is closed to release magnet 299 of Switch #1. Release magnet 299 will thus operate and restore the wipers 244–249 of Switch #1 to normal. It is to be pointed out that the wipers never rotated over the second level because the operation of relay 270 at that time opened contacts 274 leading to rotary magnet 295. Upon the wipers being restored to normal, the VON springs will restore whereby relay 260 will restore and release magnet 299 deenergizes. The restoration of relay 260, at contacts 261 again closes a circuit to operate relay 265 from ground on C conductor C202. The restoration of the wipers will open NPS contacts 279 to open the operating circuit to relay 270, and the operation of relay 265 at contacts 266 opens the locking circuit to relay 270, causing relay 270 to restore. Switch #2 (FIG. 2B) will now operate as the third selector in response to the third dialled digit.

The third digit to be dialled is the digit "5," whereby pulsing relay 240 will intermittently restore and reoperate responsive to the receipt of five impulses. Upon the intermittent restoration of relay 240, at contacts 242 a circuit is closed to vertical magnet 280 of Switch #2, the circuit extending from ground, contacts 225, 235, 242, 253, 267, 277', winding of vertical magnet 280, to battery. The intermittent opening and closing of contacts 242 will pulse vertical magnet 280, which will in turn step the wipers 244', 245', 246', 247', 248', and 249' vertically to the level of banks of Switch #2 for the digit received. Upon the wipers taking the first vertical step, the VON springs of Switch #2 will operate whereby; VON contacts 284 close to prepare a circuit to rotary magnet 281; VON contacts 285 close an obvious circuit to operate relay 260; VON contacts 287 close to prepare a circuit to release magnet 289. The operation of relay 260 at contacts 262 will cause relay 265 to remain operated in parallel with vertical magnet 280 during pulsing. At contacts 263 a circuit is prepared to rotary magnet 281.

At the end of the series of five digital impulses, relay 240 reoperates and vertical magnet 280 will have stepped the wipers 244'–249' to the fifth level of the banks of Switch #2. Relay 265 restores whereby at contacts 268 a circuit is closed to energize rotary magnet 281; the circuit extending from ground, contacts 252, 263, 217, 212, 228, 238, 268, 274, 283, VON contacts 284, interrupter contacts 286, winding of rotary magnet 281, to battery. Rotary magnet 281 by means of its interrupter contacts 286 will thus rotate the wipers 244'–249' over the fifth level in search of an idle bi-level repeater, such as repeater 25. The searching of an idle switch is accomplished in a manner identical to that previously described with respect to Switch #1, with the exception of the wipers and banks used, and the detailed description thereof is considered unnecessary.

Bi-level repeater 25 is identical to repeaters 13, 14 and 15, and incoming selector 30'' is identical to incoming selectors 30 and 30' and the detailed operations thereof are not considered necessary. However, it is to be understood that upon bi-level repeater 25 being accessed from the fifth level of selector 20 (Switch #2), no ground will be forwarded to incoming selector 30''. In this case, Switch #1 of incoming selector 30'' (FIG. 3) will be used to complete the call to subscriber A via a fifth selector, such as 18 and a connector, such as 16.

Assuming the call was intended for subscriber B, bi-level repeater 25 would have to be accessed from level six of Switch #2 of incoming selector 20. In this case ground would be forwarded by repeater 25 to operate Switch #2 of incoming selector 30'', which would in turn extend the call via a fifth selector, such as 19 and a connector, such as 17.

Calls to other non-tandem offices in district 92 would be accessed from the banks of selector 20. For instance, subscribers having the first three directory digits "927" or "928" would be handled by Office 92B, and would be assessed from levels seven and eight of the banks of Switch #2 of selector 20.

Calls to local subscribers in Tandem Office 92 would also be accessed from the banks of selector 20. In this case, subscribers having the first three directory numbers "921," "922," "924," or "929" would be handled by Tandem Office 92, and would be accessed from levels one, two, four and nine of the banks of Switch #2 of selector 20.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desired to have protected by issuance of Letters Patent of the United States is set forth in the appended claims.

What is claimed is:

1. In an automatic telephone system, a numerical switch having a first twin set of wipers accessible to two sets of corresponding levels of bank contacts, a second twin set of wipers in said numerical switch accessible to a second corresponding two sets of levels of bank contacts, a first plurality of magnets in said switch for stepping said first set of wipers and a second plurality of magnets in said switch for stepping said second set of wipers independently thereof, a plurality of relays common to both of said plurality of magnets, said relays acting upon receipt of digital impulses for directly and commonly controlling the operation of either predetermined plurality of magnets for simultaneously stepping their corresponding twin wiper sets to select a pair of levels in their respective sets over said selected, levels of bank contacts corresponding to the digit received; said predetermined magnets thereafter effective to automatically operate their respective wipers over the selected level in search of an idle trunk, and either of two relays of said plurality of relays controlling the extension of said call depending upon which one of the operated predetermined twin sets of wipers finds bank contacts terminating an idle trunk.

2. In an automatic telephone system, a numerical switch having a first twin set of wipers accessible to two corresponding sets of levels of bank contacts, a second twin set of wipers in said numerical switch accessible to a second two corresponding set of levels of bank contacts, a first plurality of magnets in said switch for stepping said first set of twin wipers and a second plurality of magnets in said switch for stepping said second twin set of wipers independently thereof, a plurality of relays in said switch common to both of said plurality of magnets including a differential relay, a repeater terminating said numerical switch, a plurality of paths for seizing said repeater, means in said switch dependent upon the path over which said repeater is seized for predetermining whether said repeater will forward a momentary pulse of potential or no pulse into said numerical switch, certain of said plurality of relays operating responsive to seizure for preparing said first plurality of magnets for operation in case no momentary pulse of potential is received, said differential relay operating in combination with said certain plurality of relays responsive to receipt of said momentary pulse of potential to prepare said second plurality of magnets for operation, said relays responding to the receipt of digital impulses transmitted from said repeater for controlling the operation of said prepared plurality of magnets for simultaneously stepping their corresponding twin wiper sets to select a pair of said levels and over said selected levels of bank contacts in search of an idle trunk without operating the non-prepared plurality of magnets and their corresponding twin wiper sets.

3. In an automatic telephone system, a numerical switch having a first twin set of wipers having access to two corresponding sets of levels of bank contacts, a second twin set of wipers in said numerical switch having access to a second two corresponding sets of levels of bank contacts, a first plurality of magnets in said switch for stepping said first set of twin wipers and a second plurality of magnets in said switch for stepping said second twin set of wipers independently thereof, a plurality of relays in said switch common to both of said plurality of magnets including a differential relay, a repeater terminating said numerical switch, a plurality of paths for seizing said repeater, means in said switch dependent upon the path over which said repeater is seized for predetermining whether said repeater will forward a momentary pulse of potential or no pulse into said numerical switch, certain of said plurality of relays operating responsive to seizure of said numerical switch for preparing said first plurality of magnets for operation, said differential relay operating in combination with said certain relays responsive to the receipt of said momentary pulse of potential to prepare said second plurality of magnets for operation in case no momentary pulse of potential is received, said relays responding to the receipt of digital impulses transmitted from said repeater for controlling the operation of said prepared plurality of magnets for simultaneously stepping their corresponding twin wiper sets one step for each impulse received to select a pair of said levels and over said selected levels of bank contacts, each wiper set of the utilized twin set will search over its own said selected level in search of an idle trunk and upon the wiper set first finding an idle trunk will initiate a particular relay of the plurality to extend a telephone call therethrough regardless of which predetermined twin set of wipers are being utilized.

4. In a telephone system, a selector controlled over a two-conductor leading-in trunk and having access to any of four groups of trunks through a corresponding plurality of wiper sets arranged in pairs, an individual stepping mechanism in said selector for each pair of wiper sets for independent operation thereof; and means in said selector, controlled from the end of the trunk remote from the selector switch incidental to the seizure of the said end of the trunk by a preceding switch, for determining which stepping mechanism will be utilized for simultaneously stepping the corresponding pair of wiper sets over their corresponding groups of trunks.

5. In a telephone system, a selector controlled over a two-conductor leading-in trunk and having access to either of four groups of trunks through a corresponding plurality of wiper sets arranged in pairs, individual stepping mechanisms in said selector for each pair of wiper sets for independent operation thereof, relay means responsive to the receipt of a first series of digital impulses for controlling a first of said stepping mechanisms to step a first pair of wiper sets one step for each impulse received to select an idle trunk in their corresponding groups of trunks, means in said selector operative in case said first series of digital impulses corresponds to a predetermined digit for releasing said first stepping mechanism to cause, said first pair of wiper sets to drop-back and for preparing said second stepping mechanism for operation, and said relay means responsive to the receipt of a second series of digital impulses for controlling the prepared second stepping mechanism to step a second pair of wiper sets one step for each impulse received to select an idle trunk in their corresponding groups of trunks.

6. In an automatic telephone system, a numerical switch of the trunk hunting type for inclusion in a telephone switch train, a first twin set of wipers in said numerical switch having access to a first two corresponding sets of levels of bank contacts, a second twin set of wipers in said numerical switch having access to a second two corresponding sets of levels of bank contacts, a first and second stepping mechanism in said switch with one mechanism for each twin set of wipers, relay means in said numerical switch commonly controlling each of said stepping mechanisms independently thereof, said relay means acting responsive to the receipt of a first series of digital impulses to initiate the operation of said first stepping mechanism, the operation of said first stepping mechanism stepping the first twin set of wipers one step for each impulse received to select an idle trunk in their corresponding sets of levels, means responsive to the receipt of a predetermined first series of digital impulses for releasing said operated first stepping mechanism to cause said first twin set of wipers to drop back after receipt thereof and prepare the second stepping mechanism to react as a succeeding switch in said telephone switch train, said relay means again acting responsive to the receipt of a second series of digital impulses to initiate the operation of said second stepping mechanism, the operation of said second stepping mechanism stepping the second twin set of wipers one step for each impulse received to select their two corresponding levels in their two sets of levels of bank contacts, and means operated to extend the switch train through one of the two selected levels by the set of said twin wiper sets which first finds an idle succeeding switch.

7. In a telephone system, a selector controlled over a two-conductor leading-in trunk and having access to any of four groups of trunks through a corresponding plurality of wiper sets arranged in pairs, an individual stepping mechanism in said selector for each pair of wiper sets for independent operation thereof; means in said selector, controlled from the end of the trunk remote from the selector incidental to the seizure of the said end of the trunk by a preceding switch, for determining which stepping mechanism will be utilized for simultaneously stepping the corresponding pairs of wiper sets over their corresponding groups of trunks; a first relay in said selector common to a first control wiper in each pair of wiper sets, a second relay in said selector common to a second control wiper in each pair of wiper sets, means commonly responsive to the receipt of digital impulses for pulsing the predetermined one of the stepping mechanisms for causing a primary and secondary directional stepping of the corresponding wiper sets, said first relay operating to extend a connection over an idle trunk encountered by the first control wiper of either pair of wiper sets depending upon which pair is being utilized, and said second relay operating to extend a connection over an idle trunk encountered by the second control wiper of either pair of wiper sets depending upon which pair is being utilized.

8. In a telephone system as claimed in claim 7 including means whereby, the extending of a connection by either the first or second relay is determined by the control wiper which first finds an idle trunk.

9. In a telephone system, an incoming trunk line having a pair of line conductors, a relay group terminating said conductors, a first and second switch mechanism permanently connected to said relay group, each mechanism including a set of wipers, a set of bank contacts accessible to each set of wipers, each set of bank contacts divided into a plurality of levels of bank contacts, stepping means individual to each mechanism for independently stepping its corresponding set of wipers in primary and secondary movements, means for seizing said relay group over said conductors, means in said relay group responsive to digital impulses received over said conductors for operating either one of said stepping means in its primary movement to cause the corresponding switch mechanism and its wiper set to select a particular level of bank contacts corresponding to said received digital impulses and for thereafter causing said wiper set in its secondary movement to select and connect with certain bank contacts in said selected level, and means in said relay group controlled over said conductors for determining which one of said stepping means and switch mechanisms will be controlled by said relay group to complete the connection to said certain bank contacts.

10. In a telephone system, an incoming trunk line having a pair of line conductors, a relay group terminating said conductors including a first and second switching relay, a first and second switch mechanism permanently connected to said relay group, each mechanism including a pair of sets of wipers, a set of bank contacts accessible to and corresponding to each set of wipers, stepping means individual to each mechanism for stepping its corresponding pair of sets of wipers independently thereof, means for seizing said relay group over said conductors, means in said relay group responsive to digital impulses received over said conductors for operating said first stepping means to cause its corresponding switch mechanism and pair of wiper sets to hunt for an idle trunk on certain corresponding bank contacts, means responsive to the receipt of a predetermined series of digital impulses to cause said pair of wiper sets of said first switch mechanism to drop back and prepare the second switch mechanism for operation, means responsive to the receipt of a second series of digital impulses received over said conductors for operating said second stepping means to cause its corresponding switch and pair of wiper sets to hunt for an idle trunk on their certain corresponding bank contacts, said first switching relay operating responsive to one of said pairs of wiper sets finding an idle trunk for extending a connection thereover regardless of which pair of wiper sets are being utilized, said second switching relay operating responsive to the other of said pairs of wiper sets finding an idle trunk for extending a connection thereover regardless of which pair of wiper sets are being utilized.

References Cited in the file of this patent

UNITED STATES PATENTS

| | | |
|---|---|---|
| 2,222,126 | Taylor et al. | Nov. 19, 1940 |
| 2,513,949 | Long | July 4, 1950 |
| 2,640,108 | Taylor | May 26, 1953 |
| 2,845,493 | Muller | July 29, 1958 |